April 24, 1928. 1,667,478
R. E. KLETT
COLORIMETER
Filed Nov. 25, 1924 2 Sheets-Sheet 1
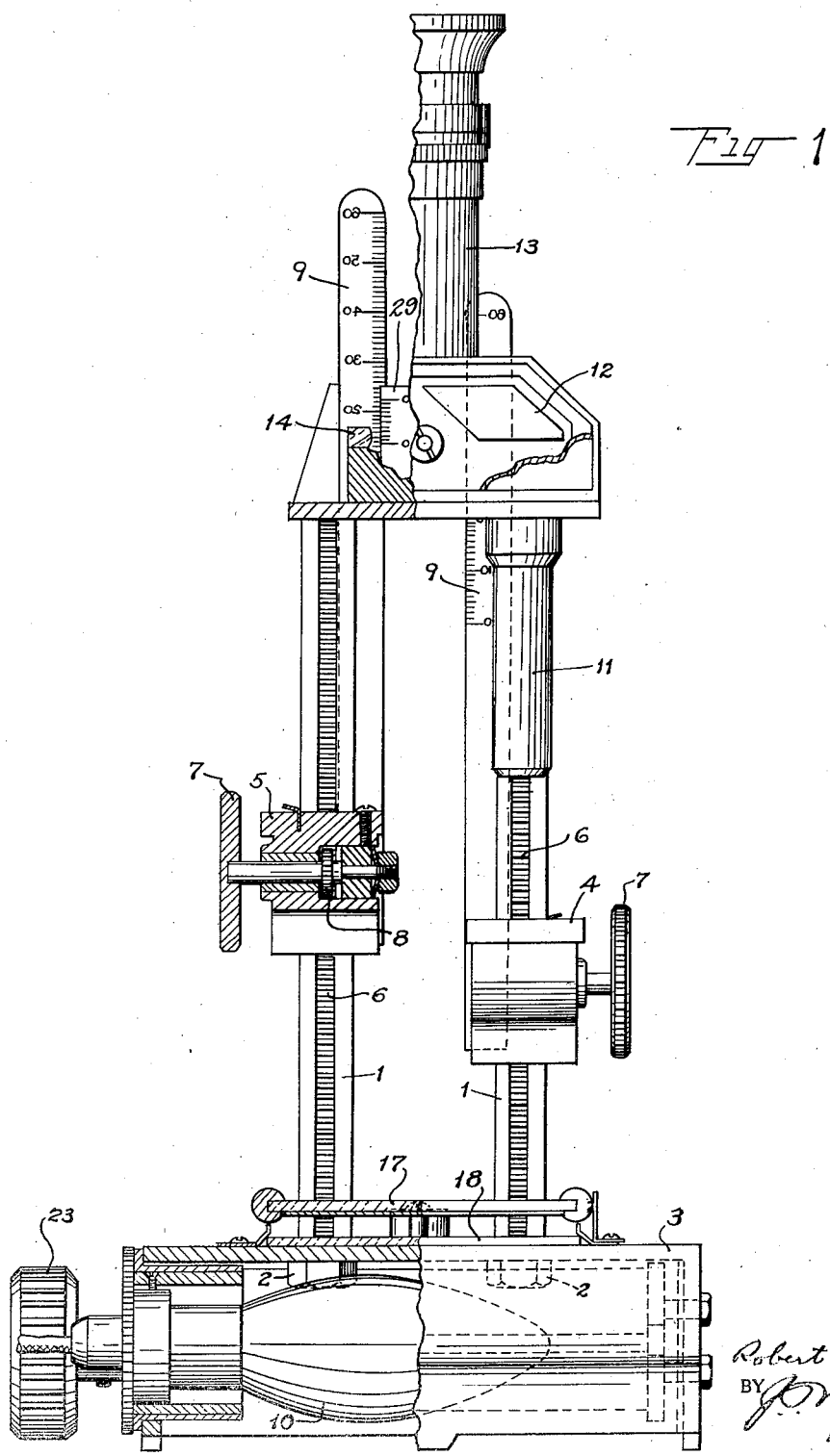

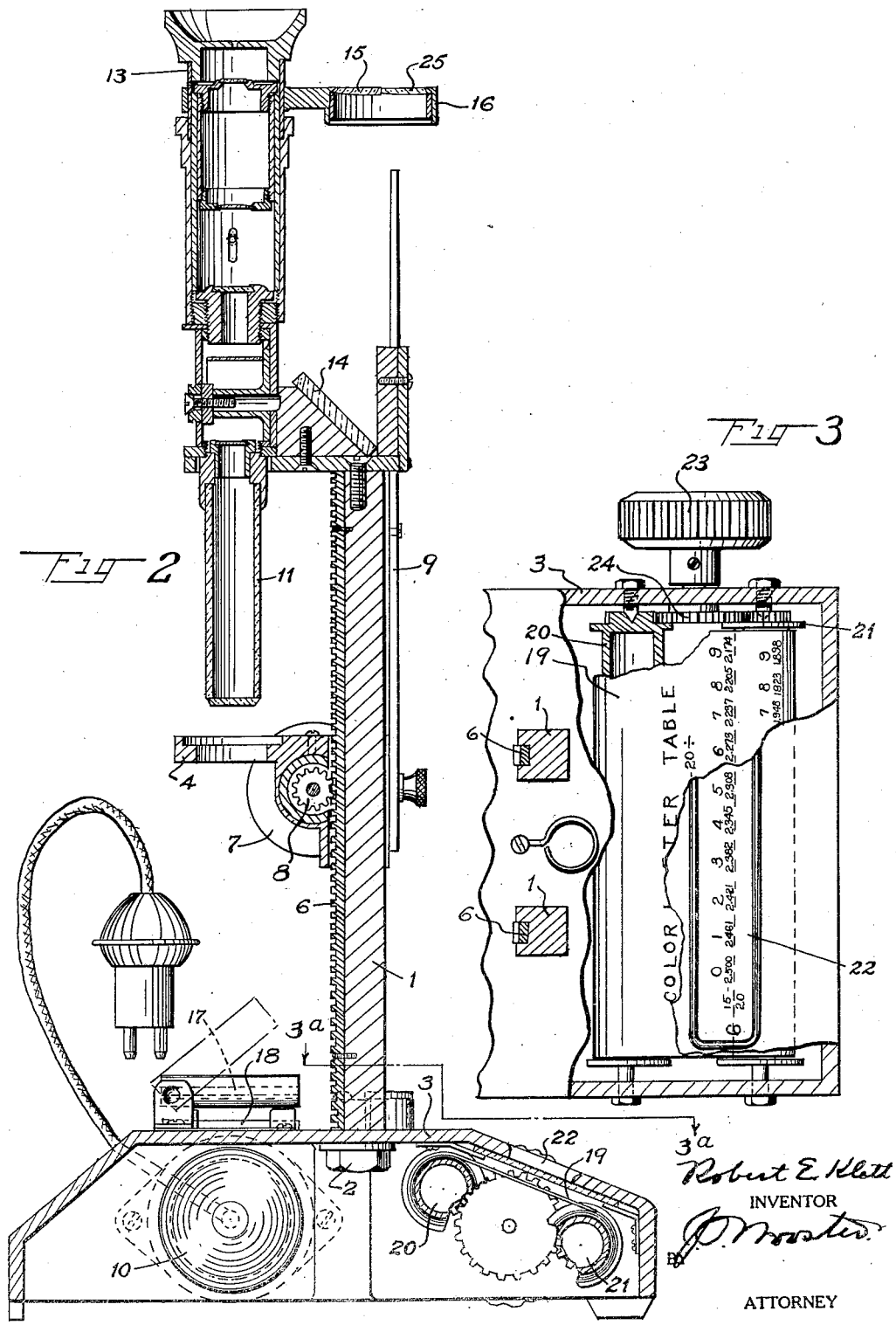

Patented Apr. 24, 1928.

1,667,478

UNITED STATES PATENT OFFICE.

ROBERT E. KLETT, OF TEANECK, NEW JERSEY, ASSIGNOR TO KLETT MANUFACTURING COMPANY, INC., OF NEW YORK, N. Y., A CORPORATION OF NEW YORK.

COLORIMETER.

Application filed November 25, 1924. Serial No. 752,163.

This invention relates to colorimeters and has for its object to provide such a device which is easier to operate, more rapid, less tiring on the operator's eyes and adapted for operation with either natural or artificial light.

After taking reading, the operator usually turns to a reference chart on the wall in back of him, or elsewhere, and the time taken in referring to this chart prevents rapid manipulation of the colorimeter and unduly delays the operation of testing a number of samples. Daylight is preferable, but after dark artificial light is necessary and in using the artificial light it is frequently arranged in a manner to tire the operator's eyes by the glare, besides being of a different color and not equal to daylight with the result that readings with one kind of light are not necessarily the same as those using another kind.

According to this invention, these disadvantages are overcome by providing the reference table in roll form in a casing at the base of the colorimeter where it may be observed by the operator from a position above and closely adjacent his position for observing the scale readings by means of a bifocal lens. A daylight lamp within the casing illuminates both the reference table and the colors to be observed.

In the accompanying drawings:

Fig. 1 is a view of a colorimeter with parts broken away,

Fig. 2 is a side view partly in section of the colorimeter of Fig. 1, and

Fig. 3 illustrates the chart for indicating the relationship between the color intensity indicating scales.

The colorimeter illustrated is broadly of the same general type as that described in my prior Patents #1,324,160, dated December 9, 1919, and 1,535,070 dated April 21, 1925, except that this colorimeter differs by the addition of certain improvements to save the operator's time in testing a large number of samples.

The frame comprises substantially vertical uprights 1 secured to the hollow base 3 by nuts 2 threaded on the ends of the frame members. Slidably mounted on each of the uprights are stages or platforms 4 and 5 adapted to support standard and test solutions, respectively, and to allow light rays from below to be passed through the solution. A stationary rack 6 is fixed to each upright whereby the stages 4 and 5 may be adjusted vertically by manipulating the knurled nut 7 which rotates the pinion 8 engaging the rack 6 and raising or lowering a stage. Secured to each stage and vertically movable therewith is an upright scale member 9 cooperating with a vernier 29 in the upper portion and having the graduations applied thereon as illustrated so as to be correctly readable from above through the lens 15 and reflector 14. Within the hollow base is a lamp bulb 10 located substantially directly beneath the hollow tubes 11 through which the light rays passing through the standard and test solutions are upwardly directed to be reflected by the prisms 12 into the color observing eye-piece 13. Although only one prism 12 is shown in the drawing, it will be understood that two such prisms are provided to bring the light rays which traverse the standard and test solutions within the field of eye-piece 13 as disclosed, for example, in my prior Patent #1,535,070. The aperture in the hollow base directly above the lamp 10 is closed by a piece of blue glass 18 so that when artificial light is used with this colorimeter the rays have a substantial daylight hue. A reflector 17 pivoted to one side of the aperture may be raised to the positions shown in dotted lines in Fig. 2 for directing daylight into the color observing means, or this reflector may be swung in a counterclockwise direction from its position indicated in Fig. 2 so as to uncover the aperture in the top of the hollow base and allow the artificial light rays to be used with the color observing means.

For purposes of indicating the relation between the readings of scale members 9 or color intensity indicating means, and as a help in comparing results, a movable chart 19 is positioned in another portion of the hollow base beneath a second aperture 22 and wound on the rolls 20 and 21 actuated by the knurled knob 23 through the gear 24 engaging said rolls. The lens within the frame 16 at the top of the colorimeter adjacent the color observing eye-piece 13 is a bifocal lens, the portion 15 being for observing the color intensity indicating means or the images of scale members 9 in the reflector 14, while the portion 25 of this lens is for reading the movable chart 19 through the aperture 22. If desired, all lenses may be arranged to have their fields of vision appear at substantially the same distance from the observer's eye. The movable chart 19 is preferably of a paper or parchment thin enough to allow a little of the rays from the lamp 10 to be transmitted through, so that the lamp may readily illuminate this chart 19. As shown in Fig. 3, the members 15 or 20 on the chart 19 observable through aperture 22 indicate the reading of the standard scale member 9 while the numeral 6 on chart 19. pictured in Figure 3 at the left end of the aperture 22 indicates the reading of the test solution scale member 9. The numbers 0 to 9 indicate 10ths in the test solution scale, and the numbers below are the reference figures desired by the operator for his computations.

Among the advantages of this invention may be mentioned the saving in time and facility of obtaining results. Heretofore the reference chart was either on the table by the operator where it could be affected by acids, or possibly on the wall at his back, where time would be required in turning around to look at it. By locating the reference chart in the base of the colorimeter and making it observable through a lens closely adjacent the other eye-pieces substantially no time is lost by the operator in reading the table when readings of the color observing means and color intensity indicating means are being taken. Substantially no movement of the operator's head, or at least only a very slight movement, if any, is required, to shift his glance from that through the lens 15 to that through the lens 25 for reading the chart. The lamp located in the base of the colorimeter being a daylight lamp is better adapted to give uniform results with both natural or artificial light. No movement of the lamp fram one position to another is necessary in transforming this colorimeter for use from natural to artificial light, only a movement of the reflector 17 being necessary. The lamp 10 may illuminate the chart 19 regardless of whether natural or artificial light is being used in the color observing means. The lamp and chart are not in the way of the operator but are compactly arranged within the hollow base of the instrument. It will be appreciated that this invention constitutes a substantial means for saving time when it will be noticed that all readings necessary for color comparison work may be taken from the same position, that is, with the operator's head over the instrument for reading the color observing means, color intensity indicating means, and the chart or means for indicating the relation between the intensities of color.

I claim:

1. In a colorimeter, the combination with color observing means for standard and test solutions, of color intensity indicating means for each of the solutions, means carried by said colorimeter for indicating the relation between said intensities of colors, and means adjacent the first mentioned means for observing the last two mentioned means.

2. In a colorimeter, the combination with a color observing means for standard and test solutions, of color intensity indicating means for said solutions, and a reference means indicating the relation between the intensities of colors carried by said colorimeter and located in a position to be readable in the same general direction and from substantially the same position of the operator's head as in reading either of the first two mentioned means.

3. In a colorimeter, the combination with color observing means for standard and test solutions, of color intensity indicators for said solutions, a reference chart at the lower end of the colorimeter for indicating the relation between said color intensity indicators, and means for reading said color intensity indicators and said chart in a downward direction from substantially the same position.

4. In a colorimeter, the combination with color observing means for standard and test solutions, of means for indicating the color intensity of each of said solutions, a reference chart associated with said colorimeter for indicating the relation between said color intensity indicating means, and means for reading said color intensity indicating means and said chart in substantially the same direction and in substantially the same field of view.

5. In a colorimeter, the combination with color observing means for standard and test solutions, of means for indicating the color intensity of each of said solutions, means associated with said colorimeter for indicating the relation between said color intensity indicating means, and means including a bifocal lens adjacent said color observing means for observing said last two mentioned means.

6. In a colorimeter, the combination with a supporting base, of color observing means for standard and test solutions, means for indicating the color intensity of each of said solutions, a movable chart mounted in said supporting base for indicating the relation between said color intensity indicating means, a mirror for reflecting an image of said color intensity indicating means, and an eye-piece adjacent said color observing means having a lens for observing said chart and another lens for observing the image of said color intensity indicating means in said mirror.

7 In a colorimeter, the combination with a supporting base, of color observing means for standard and test solutions, color intensity indicators for each of said solutions, a movable chart mounted in said supporting base for indicating the relation between the readings of said color intensity indicators, and a common source of light within said supporting base illuminating said color observing means and said chart.

8. In a colorimeter, the combination with a supporting base, of recessed platforms for supporting standard and test solutions, color observing means for said solutions, color intensity indicators associated with each of said platforms, a movable chart mounted in said supporting base for indicating the relation between the readings of said color intensity indicators, a source of light within said supporting base illuminating said chart, and a movable reflecting closure for said base adapted in one position to permit light rays from said source to illuminate said recessed platforms and in another position to reflect light from an outside source upon said platforms.

9. A colorimeter comprising platforms for supporting standard and test solutions, means for moving said platforms, color observing means for the solutions, color intensity indicators movable with said platforms, a chart in the lower portion of the colorimeter for indicating the relation between said color intensity indicators, and means adjacent said color observing means for observing said color intensity indicators and said chart.

10. A colorimeter comprising platforms for supporting standard and test solutions, means for moving said platforms, color observing means for the solutions, color intensity indicators mounted on said platforms, a chart in the lower portion of the colorimeter for indicating the relation between said color intensity indicators, a mirror for reflecting an image of said color intensity indicators, and a bifocal lens adjacent said color observing means and substantially above said mirror and said chart.

11. A colorimeter comprising a supporting base, movable stages for supporting standard and test solutions, color observing means for the solutions, scales movable with said stages for indicating the color intensity of the solutions, a movable chart mounted in said supporting base for indicating the relation between said scales, a mirror for reflecting an image of said scales, an eye-piece adjacent said color observing means and substantially above said mirror and said chart, and a source of light in said supporting base for illuminating said chart and said stages.

12. A colorimeter comprising a hollow base containing an aperture, color observing means for standard and test solutions, a daylight lamp in said base illuminating said color observing means through said aperture, and a reflector movable to cover said aperture and reflect outside light such as daylight into said color observing means.

13. A colorimeter comprising a hollow base containing an aperture, color observing means including an eye-piece for observing standard and test solutions, scales for indicating the color intensity of the solutions, a chart in said base adjacent said aperture for indicating the relation between said scales, and means including a bifocal lens mounted adjacent said eye-piece and above said aperture for observing said scales and chart.

14. A colorimeter comprising a hollow base, movable stages for supporting standard and test solutions, means for moving said stages in a vertical direction, means including an eye-piece for observing both solutions at any point in their travel, graduated scales movable with said stages for indicating the color intensity of the solutions, a mirror set at approximately 45° to the line of movement of said scales, a chart in said supporting base for indicating the relation between said scales, and a second eye-piece mounted adjacent said first mentioned eye-piece and substantially above said mirror and said chart 15. A colorimeter comprising a hollow base containing an aperture, movable stages for supporting standard and test solutions, means for moving said stages in a vertical direction, means including an eye-piece for observing both solutions at any point in their travel, graduated scales movable with said stages for indicating the color intensity of the solutions, a mirror set at approximately 45° to the line of movement of said scales, a chart in said supporting base for indicating the relation between the readings of said scales, a second eye-piece containing a bifocal lens mounted adjacent said first mentioned eye-piece for observing said chart and the image of said scales in said mirror, a source of light in said hollow base illuminating said chart, and a movable reflector adapted in one position to permit light from said source to illuminate said stages through said aperture and in another position to close said aperture and reflect light from an outside source upon said stages.

Signed at New York city, in the county of New York and State of New York this 18th day of November A. D. 1924.

ROBERT E. KLETT.